United States Patent [19]

Sheehan

[11] Patent Number: 5,200,575

[45] Date of Patent: Apr. 6, 1993

[54] CONNECTOR ASSEMBLY FOR CONDUIT

[76] Inventor: Robert K. Sheehan, 571 Rolling Rock La., Cincinnati, Ohio 45255

[21] Appl. No.: 841,583

[22] Filed: Feb. 25, 1992

Related U.S. Application Data

[63] Continuation-in-part of Ser. No. 646,352, Jan. 25, 1991, abandoned.

[51] Int. Cl.⁵ ............................................. H02G 3/06
[52] U.S. Cl. ................................. 174/65 R; 285/162
[58] Field of Search .............. 174/65 R, 151, 152 R, 174/153 R; 285/161, 162; 248/56

[56] References Cited

U.S. PATENT DOCUMENTS

| | | | |
|---|---|---|---|
| 1,106,761 | 8/1914 | Weikert et al. | 285/162 |
| 1,131,399 | 3/1915 | McGinley | 285/158 |
| 1,452,268 | 4/1923 | Erickson | 285/329 |
| 1,982,464 | 11/1934 | Buchanan | 52/221 |
| 2,476,407 | 7/1949 | Eriksen et al. | 174/158 R |
| 2,490,363 | 12/1949 | Lang | 285/315 |
| 2,858,358 | 10/1958 | Hawke | 174/89 |
| 3,006,664 | 10/1961 | Appleton et al. | 285/248 |
| 3,174,776 | 3/1965 | Berger | 285/162 |
| 3,285,551 | 11/1966 | Tschanz | 248/56 |
| 3,746,373 | 7/1973 | Prudente | 285/162 |
| 4,150,845 | 4/1979 | Riuli et al. | 285/81 |
| 4,234,218 | 11/1980 | Rogers | 285/162 |
| 4,250,348 | 2/1981 | Kitagawa | 174/65 SS |
| 4,358,079 | 11/1982 | Navarro | 248/56 |
| 4,366,344 | 12/1982 | Sheehan | 174/65 R |
| 4,468,535 | 8/1984 | Law | 174/65 R |
| 4,544,186 | 10/1985 | Proni | 285/243 |
| 4,619,332 | 10/1986 | Sheehan | 180/142 |
| 4,653,835 | 3/1987 | Schulte et al. | 439/557 |
| 4,808,123 | 2/1989 | Dee et al. | 439/470 |
| 4,990,721 | 2/1991 | Sheehan | 174/65 R |
| 5,068,496 | 11/1991 | Favalora | 174/65 R |

OTHER PUBLICATIONS

Pp. 90 and 92 of *Electrical Contractor*, by W. Geighton Schwan, "Code Comments".
Advertisement of Midland Ross Corporation, "Steel City Conduit Fittings".

Primary Examiner—Leo P. Picard
Assistant Examiner—David A. Tone
Attorney, Agent, or Firm—Frost & Jacobs

[57] ABSTRACT

A connector assembly for providing a substantially fluid-tight connection of a conduit to an electrical box or other apertured bulkhead. A substantially tubular hollow connector body has a front section and a rear section, with the front section having one or more locking tabs for mounting the connector body in the aperture. A substantially hollow sealing member having proximal and distal ends is telescopingly connected over the connector body in non-rotatable condition, and may include an outwardly extending flange adjacent its proximal end. The sealing member also includes a tapered sealing bore for receiving the end of the conduit and, in some applications, includes a plurality of inwardly oriented deburring protuberances near the distal end of that bore. The assembly further includes a substantially hollow sealing sleeve telescopingly surmounting at least a portion of the sealing member. The assembly can be snapped into locking engagement and sealed about the aperture totally from the outside of the bulkhead.

28 Claims, 4 Drawing Sheets

CONNECTOR ASSEMBLY FOR CONDUIT

RELATED CASE INFORMATION

This is a continuation-in-part of co-pending application Ser. No. 07/646,352, filed Jan. 25, 1991 now abandoned.

TECHNICAL FIELD

This invention relates to a fluid-tight fitting for conduits, and, more particularly, to a connector assembly adapted to provide a substantially fluid-tight connection of a conduit to an opening in an electrical box, panel, bulkhead, appliance covering, or the like, totally from the exterior of that opening.

BACKGROUND ART

Over the years there have been a number of connector devices and fittings provided for attaching conduit, cable, cord and similar flexible members to electrical outlets, junction boxes, panels and the like. The most commonly used connectors include a locking nut which secures the connector to the electrical box by threaded interaction with an externally threaded male portion which is pushed through a knockout or hole in the electrical panel. Examples of clamping devices utilizing a threaded nut within the electrical box to attach the device to the box include those shown in U.S. Pat. Nos. 2,858,358 (which issued to W. Hawke) and 4,250,348 (which issued to H. Kitagawa). Particularly, Hawke contemplates screwing its clamp body A into the wall of a switch casing or other fitting, with further securement by a locknut within the switch casing if desired. Similarly, the Kitagawa clamping device includes a cylinder formed with threads corresponding with internal threads of a nut which may be used to fix the body on a wall plate. While the Hawke patent does not illustrate any means for sealing its clamp body adjacent the wall of a switch casing, Kitagawa provides that its annular flange may be formed with a small projection, or that a washer may be disposed on the side of the flange falling in contact with the wall plate for providing a fluid-tight connection. The Hawke clamping gland further requires the cutting back of the outer sheath and armor of a flexible electrical cable prior to engagement with a subassembly which fits into the clamp body. Thereafter, a cover member is screwed upon the clamp body to secure the multi-piece subassembly therewithin and to clamp the cable in place. The Kitagawa clamping device includes a plurality of elastic legs having projections on their distal ends and a cylindrical packing ring which bind against a cable held within the clamping device when a threaded clamping pipe is tightened onto the lower portion of the clamping device.

Because electrical boxes and panels are often relatively small and/or house a plurality of other wires, cables, and connectors, it is often quite difficult to secure a locking nut onto the male portion of a connector inserted into that electrical box, as required by these prior art devices. Cross-threading of the lock nut on the threaded male portion of the connector, and the inherent difficulty in applying a tightening tool to the lock nut and connecting device, resulted in difficult installations and often loose connections. As the electrical conduit, connector, and electrical box are often part of an electrical grounding path, loose lock nuts and connections can present serious safety hazards such as shock, electrocution, malfunction, and/or fire.

Another prior fitting for flexible conduit having many of these same shortcomings is described in U.S. Pat. No. 3,006,664 (which issued to A. Appleton et al.). Particularly, the Appleton fitting includes a thin annular end portion adapted to be inserted into an aperture of an electrical box. Once inserted into the box, the annular end must be spun or peened to form a bead capable of securely holding the fitting body in the box. While the Appleton et al. fitting includes an inner sleeve formed with spiral threads to interact with the structural groove within an electrical conduit to be connected, and a sealing nut which slips over the end of a conduit and bends a flange on the inner sleeve against the conduit when tightened into place, the annular end portion which must be formed after insertion into an electrical box will require inconvenient spinning or peening forming operations after insertion along with all of the other problems described above.

Other coupling devices, such as shown in U.S. Pat. No. 1,106,761 (which issued to A. Weikert, et al.), avoid a need for use of lock nuts or inconvenient attachment operations by providing a plurality of spring grippers formed in a longitudinally split blank of metal. In conjunction with an adjustable collar which rotatably surrounds the central portion of the connector body, the Weikert et al. device provides a locking means which does not require the post-insertion attachment of a locking nut within the electrical box. Weikert et al., however, require a large number of parts which must be assembled, including a separate band which is to be tightened by a bolt/nut combination about a plurality of gripping devices for locking the coupling to the conduit.

Another snap-in device is shown in U.S. Pat. No. 3,285,551 (which issued to A. Tschanz), which includes a tubular body having a forward tapered portion with a plurality of slots to enable insertion into an opening in an electrical box. An outwardly extending flange can be provided in a spring-like manner to firmly hold the body in an opening of the electrical box once inserted. The rear portion of the tubular body is also slotted and tapered, whereby an internally threaded nut having an inner tapered surface can be tightened onto the tubular body to bind the slotted/tapered portion onto flexible conduit held therewithin. The Tschanz assembly, however, relies upon careful dimensional tolerance of the assembly itself to establish and maintain a sealing fit with the aperture of an electrical box. Variations in manufacturing accuracy and field conditions can provide sizable margins of error resulting in improper or loose connections.

The feed-through device of U.S. Pat. No. 4,234,218 (which issued to A. Rogers) includes a first tubular member having integral deformable segments which can be pushed through an aperture in an electrical box and which spring back to their original configuration once inserted. A non-deformable heat recoverable member is then inserted within the first tubular member to prevent the deformable segments from thereafter being deformed inwardly. The heat recoverable insert is thereafter shrunk fit onto a cable to form a pressure tight seal. Such a heat shrinkable connecting device cannot, by itself, provide an electrical grounding path. Consequently, in addition to requiring the application of heat as part of the connection procedure, additional grounding structure and assembly may be required in many circumstances.

U.S. Pat. No. 4,468,535 (which issued to J. Law) also discloses a liquid-tight connector designed to be snapped into the opening of an electrical box or the like. However, as described above with respect to the Tschanz device, the Law connector inherently relies upon close manufacturing tolerances and a sealing washer to provide its liquid-tight connection. Additionally, while the Law structure includes a metallic grounding ferrule to provide electrical connection between the conduit being connected and the electrical enclosure, and provides a helical outer edge which can be screw-threaded into the inside wall of the metallic conduit, arrangements such as this require relatively careful preparation of the cut end of a metallic sheathed cable to be connected in order to provide relatively smooth surfaces for sealing within the internal portions of the connector. Preparation of the end of the conduit to be connected would add to the labor and inconvenience required in utilizing such a connector.

Another connector which does not require the application of a locking nut after insertion of the connector to an outlet box is shown in U.S. Pat. No. 1,131,399 (which issued to J. McGinley). Particularly, the McGinley arrangement contemplates the provision of an outlet box with a specially notched cutout to correspond with outwardly extending lugs formed on a coupling. The coupling lugs are inserted into the notched cutouts, then the coupler is rotated to lock the device into the opening between its flange and the lugs. This arrangement, however, requires use of special outlet boxes including notched openings, and also relies upon the coupling remaining in its rotated position to maintain the locked condition. In use, cables and their connectors are often subjected to movement and stress, including rotational forces which could cause the McGinley coupling to become disconnected from the outlet box.

As can be seen, while a wide variety of connectors have been provided and directed to achieving liquid-tight connections for conduits, cables, cords and the like, heretofore there has not been available a relatively universally applicable connector for conduits which can provide a reliable fluid-tight connection from the outside of an aperture, and which is easy to use and which can withstand the rigors of installation and service commonly encountered in the industry.

DISCLOSURE OF THE INVENTION

It is an object of this invention to obviate the above-described problems and shortcomings of the connecting devices and couplings heretofore available in the industry.

It is another object of the present invention to provide an improved connector assembly for providing a substantially fluid-tight connection of a conduit to an electrical box or other bulkhead/aperture arrangement.

It is yet another object of the present invention to provide a relatively universal connector assembly for achieving a substantially fluid-tight connection of a conduit to an electrical box, panel, bulkhead, or similar structure which can be easily inserted and automatically locked in position, and which includes a fluid-tight seal which can be manually adjusted following locking insertion.

It is yet another object of the present invention to provide a connector assembly which includes means for automatically deburring the end of a flexible conduit to be connected in order to ensure that such flexible conduit can be received in a fluid-tight manner within the assembly.

It is another object of the present invention to provide an improved connector assembly for connecting flexible, armored conduit to an electrical box, wherein the connector assembly includes an externally mounted sealing sleeve which can be selectively adjusted to ensure a fluid-tight connection of the assembly and the electrical box, and which includes detent means to prevent inadvertent loosening of the fluid-tight connection.

In accordance with one aspect of the present invention, there is described a connector assembly for providing a substantially fluid-tight connection of a conduit to an apertured wall. The assembly preferably includes a substantially tubular hollow connector body having a front section and a rear section, with the front section having one or more locking tabs for mounting the connector body in an aperture. The rear section preferably includes one or more conduit gripping ribs having an effective spiral arrangement to receive the end of a conduit to be connected. A substantially hollow sealing member having proximal and distal ends is telescopingly connected over the connector body in non-rotatable condition, and may include an outwardly extending flange adjacent its proximal end. The sealing member is also to include a tapered sealing bore for receiving the end of the conduit, and, in a preferred embodiment, includes a plurality of inwardly oriented deburring protuberances near the distal end of that bore. The flange, when included, is to have an inner surface comprising a deformable peripheral proportion having at least one annular sealing rib. The assembly further includes a substantially hollow sealing sleeve telescopingly connected over at least a portion of the sealing member and having a compression or sealing surface for sealing the assembly connection about the aperture upon tight connection of the sleeve to the sealing member.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
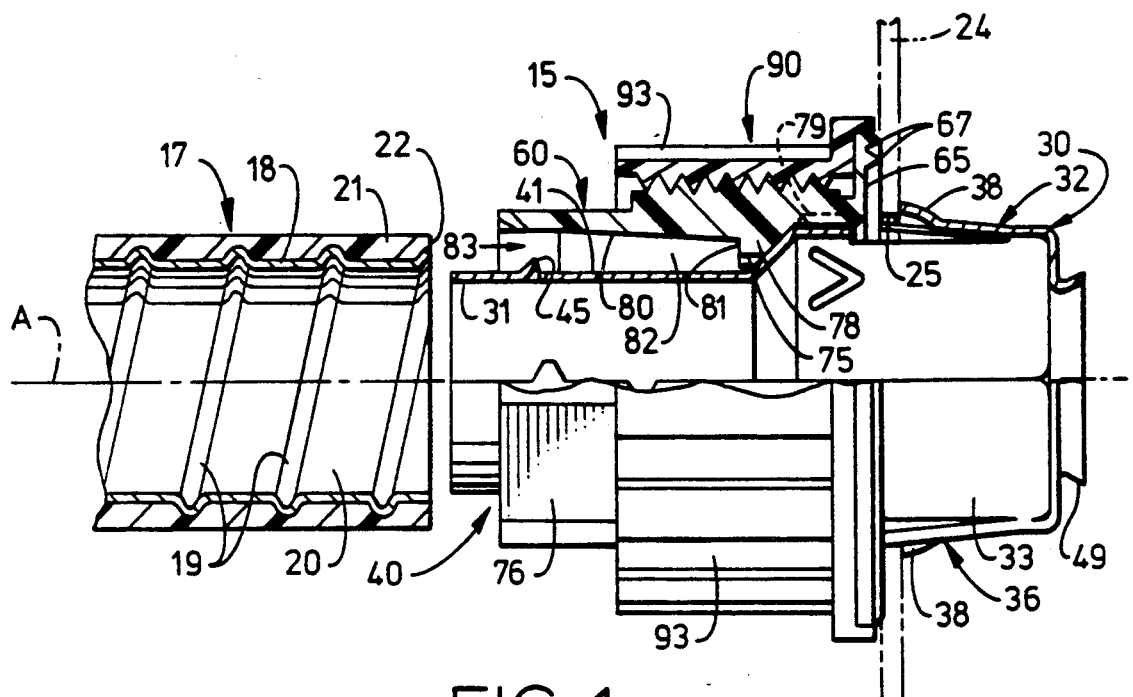
FIG. 1 is a partial cross-sectional view of a connector assembly made in accordance with the present invention and the end of a conduit to be connected, with the connector assembly shown connected to the wall of an electrical box or panel.

Referring now to the drawings in detail, wherein like numerals indicate the same elements throughout the views, FIG. 1 illustrates a preferred embodiment of a connector assembly 15 made in accordance with the present invention. Particularly, connector assembly 15 is shown as being lockingly attached within an aperture 25 of an electrical box wall 24. The term "electrical box" as used herein shall connote any outlet box, junction box, panel, bulkhead, electrical appliance or machine, or similar wall structure to which a conduit is to be attached. For simplicity, "electrical box" will be used herein as interchangeable with any of these structures, and should not be interpreted as being limited to any one application.

Connector assembly 15 of the present invention is intended to provide a reliable, substantially fluid-tight connection of a conduit, which may often be flexible and include a water tight sheath, armored, or similar substantially rigid protective covering. While the present invention is applicable for the connection of essentially any conduit, cable, cord, pipe, or armored or sheathed line, conduit 17 has been illustrated in FIG. 1 as a relatively common flexible metallic conduit having a corrugated metallic protective wall 18 comprising a plurality of helical grooves 19 arranged between adjacent spiral convolutions 20. While such metallic flexible conduit is often referred to in the industry as "BX", such conduit is often contained within a protective sheath 21 to provide fluid-tight characteristics.

Figure 2:
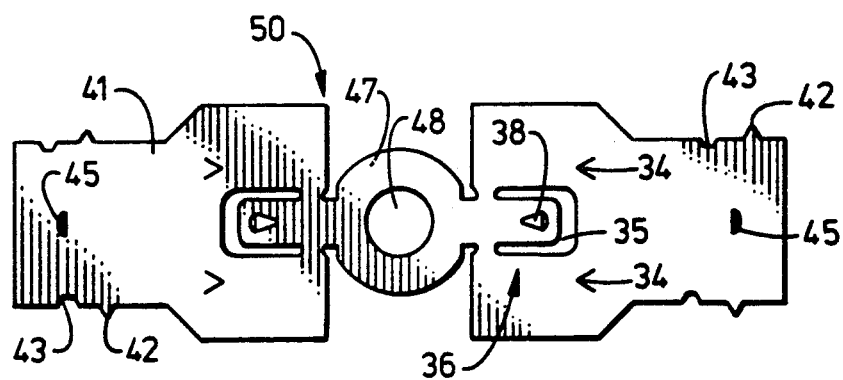
FIG. 2 is a top plain view of a blank of material from which a preferred connector body of the assembly of FIG. 1 can be formed.

Connector assembly 15 is illustrated as comprising a substantially tubular hollow connector body 30 which can preferably be formed from a single integral blank of material, such as illustrated in FIG. 2. Assembly 15 can be similar to the connector shown and described in my earlier U.S. Pat. No. 4,619,322 (issued Oct. 28, 1986). In a preferred embodiment, blank 50 might be stamped from a sheet of cold rolled steel of approximately 0.025 inches in thickness (approximately 0.064 cm), which is preferably heat treated to spring temper and finished with a zinc plating for corrosion resistance. Blank 50 is thereafter formed into the substantially tubular hollow connector body 30 by appropriate bending and forming processes.

Figure 3:
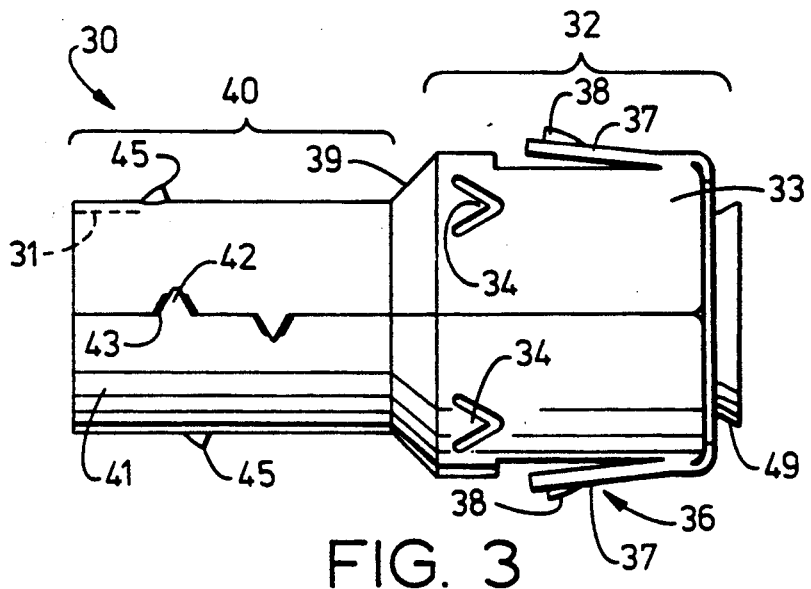
FIG. 3 is a top elevational view of the connector body formed from the blank of FIG. 2.
Figure 4:
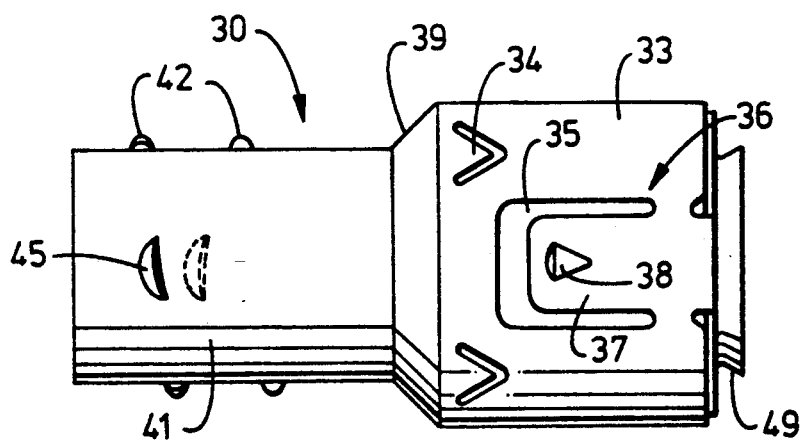
FIG. 4 is a front elevational view of the connector body of FIG. 3.
Figure 5:
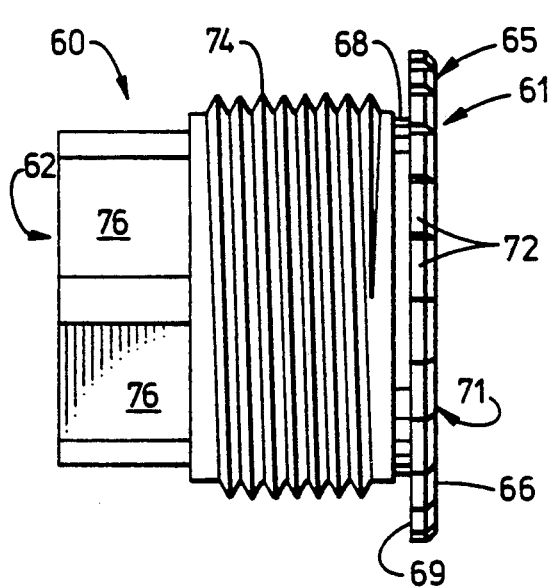
FIG. 5 is a front elevational view of a preferred sealing member of the connector assembly of FIG. 1.
Figure 6:
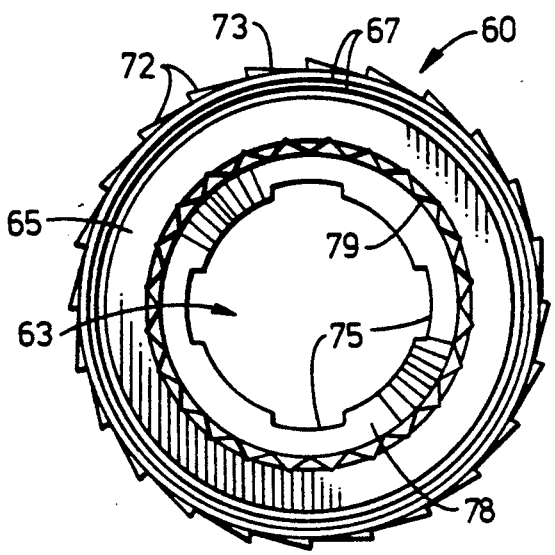
FIG. 6 is a right end view of the sealing member of FIG. 5.

As seen best in FIGS. 3 and 4, connector body 30 comprises a front section 32 and a rear section 40 having varying diameters, preferably connected by a tapered adaptor portion 39. Front section 32 preferably further comprises a substantially tubular wall portion 33 which includes a plurality of outwardly cantilevered locking tangs 34 to prevent rotation of connector body 30 relative to sealing member 60 in use, as will be described below. As should be understood, any means for conveniently providing non-rotatable connection between connector body 30 and sealing member can be substituted as appropriate.

Also formed in tubular wall 33 is one or more means 36 for lockingly mounting connector body 30 in an aperture (e.g. 25) of an electrical box. Locking means 36 is shown in a preferred arrangement as including locking tab 37 and an outwardly extending dimple 38. Locking tab 37 is shown as being formed in a cantilevered manner and separated from the balance of tubular wall 33 on three sides by a U-shaped cutout 35. Locking means 36 preferably comprises a pair of oppositely disposed locking tabs 37, as best illustrated in FIG. 3. It is also preferred that locking tabs 37 be formed in such a manner as to extend slightly outwardly from the outer periphery of tubular wall 33 to establish an inherent outward bias to dimples 38. As will be understood, cantilevered locking tabs 37 provide flexible radial displaceability of dimples 38 while maintaining their inherent outwardly biased characteristics. The interior of connector body 30 is substantially open to provide a tubular passageway 31 therethrough.

Rear section 40 is preferably provided with a substantially smaller outer diameter and correspondingly smaller inner diameter of tubular passageway 31. Adapter portion 39 provides a smooth transition between the varying diameters of front section 32 and rear section 40, as illustrated. As shown in FIGS. 2–4, blank 50 is preferably provided with a plurality of corresponding tongues or tabs 42 and notches 43 which can serve the multiple purposes of facilitating proper alignment of portions of blank 50 as it is formed into its tubular shape, preventing collapse of the tubular nature of connector body 30 under compression, and tongues 42 can also provide an outwardly extending lug which can augment conduit gripping ribs or lugs 45 which are also provided on blank 50.

Particularly, one or more gripping ribs 45 preferably extend outwardly from tubular wall 41 of rear section 40. A plurality of ribs 45 can be provided in an effective spiral arrangement as shown to correspond to and interact with spiral convolutions 20 of the flexible conduit 17 when it is connected about the periphery of tubular wall 41. As illustrated in FIG. 1, the distal end 22 of flexible conduit 17 will be telescoped over the exterior of tubular wall 41 of connector body 30, and gripping ribs 45 will enable flexible conduit 17 to be effectively "threaded" onto rear section 40 by relative rotation therebetween. Locating tongues 42 extend outwardly at locations which are preferably aligned along the effective spiral arrangement between gripping ribs 45 to augment the spiral thread provided by ribs 45. The sharp point of tabs 42 can also provide increased frictional gripping of conduit 17 as it is "threaded" onto rear section 40.

The ring-like front face 47 of blank 50 is provided to interconnect the tubular wall forming portions of blank 50, and is provided with a central aperture 48 to establish a passageway for cable or wires to be extended from connector assembly 15. As illustrated in FIGS. 1, 3 and 4, a flared rib 49 may also be formed about the periphery of aperture 48 to provide a relatively smooth edge to accommodate electrical wires and the like, and to strengthen connector body 30 as it is formed from blank 50. By forming assembly 15 of a single piece of metallic material, assembly 15 can also provide electrical grounding path continuity between the electrical box, connector and conduit.

A substantially hollow sealing member 60 is shown in FIGS. 1, and 5–7 as having a proximal end 61 and a distal end 62, with a central passageway 63 formed therethrough. As seen best in FIG. 1, sealing member 60 is designed to be telescopingly mounted over connector body 30. It is preferred that sealing member 60 be provided with means (e.g. 79) for mounting sealing member 60 in substantially non-rotatable condition relative connector body 30. To this end, locking ribs 79 are formed as an annular spline-like ring about the periphery of passageway 63 adjacent proximal end 61. When sealing member 60 is telescoped over connector body 30, locking tangs 34 of connector body 30 will fit into locking ribs or splines 79 to prevent any appreciable rotation of sealing member 60 relative connector body 30.

Sealing member 60 is illustrated as including a substantially annular seating ridge 78 formed on its inner surfaces with a plurality of slots 75 formed therein. Slots 75 provide clearance for passage of the outwardly extending tangs 34 and ribs 45 of connector body 30 as it slides into sealing member 60. Ridge 78 is preferably tapered to substantially correspond with the outer taper of adapter portion 39, whereby connector body 30 will nicely seat within sealing member 60 as shown in FIG. 1.

Outwardly extending flange 65 is provided adjacent proximal end 61 of sealing member 60, and includes an inner surface 66 circumscribing the outer periphery of said sealing member 60 and upon which one or more annular sealing ribs 67 is integrally formed. It is preferred that at least a portion of flange 65, such as the outer edge portion, will be somewhat deformable or flexible so that annular sealing ribs 67 can be effectively displaced in an inwardly direction to provide a reliable fluid-tight seal against wall 24 of an electrical box. In this regard, it has been found that the provision of an annular recess 68 about the base of flange 65 may help reduce the rigidity of flange 65 and augment its flexibility.

It is also preferred that the peripheral edge 71 of flange 65 be provided with detent means for preventing inadvertent loosening of a tight connection between sealing member 60 and hollow sealing sleeve 90, as will be discussed. Particularly, peripheral edge 71 is illustrated with a plurality of pawl-like serrated teeth 72 each having a ramp surface 73 designed to interact with corresponding ratchet lugs 96 of sealing sleeve 90. Formed about a portion of the exterior periphery of sealing member 60 behind flange 65 are a series of helical external threads 74. Behind threads 74, adjacent distal end 62, is further preferably provided a plurality of planar surfaces 76 which can be formed in a conformation corresponding to a common open-ended wrench to enable application of an appropriate tool to facilitate assembly or disassembly procedures, if required.

Figure 7:
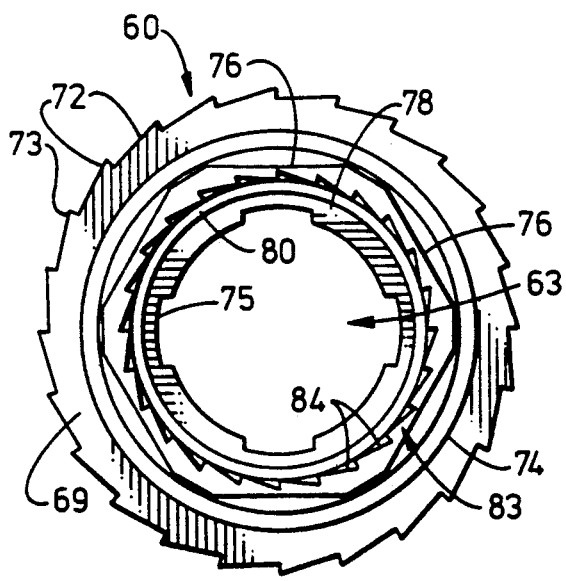
FIG. 7 is a left end view of the sealing member of FIG. 5.

As seen best in FIGS. 1 and 7, the inner distal portions of sealing member 60 are provided with a bore 80 which is preferably tapered from a larger diameter adjacent distal end 62 to a smaller diameter adjacent the underside portion 81 of ridge 78. As will be understood, when flexible conduit 17 is effectively threaded over the exterior of connector body 30 and onto gripping ribs 45, conduit 17 will be forced into the tapered space 82 between tubular wall 41 of connector body 30 and tapered bore 80. As conduit 17 is threaded onto connector body 30, it will be effectively squeezed into tapered space 82 so as to create an effective and fluid-tight seal between the protective sheath 21 and the smooth surface of tapered bore 80. As mentioned, outwardly extending tabs 42 also tend to provide relatively substantial frictional locking of the corrugated wall 18 of conduit 17 to the outer periphery of rear section 40, effectively preventing removal or loosening of conduit 17 and its seal with connector assembly 15 in use.

As will be understood, to provide the most reliable fluid-tight seal between conduit 17 and connector 15, it is important that the end 22 of conduit 17 be substantially smooth to best seal with the smooth surface of tapered bore 80. Even when relative care is taken in trimming back the protective sheath 21 and armored protection of a flexible conduit (e.g. 17), a certain amount of roughness or burrs will be left which can interfere with an optimum seal between assembly 15 and conduit 17. The assembly of the present invention, therefore, further comprises deburring means 83, which can preferably be provided in the form of a plurality of protuberances or teeth 84 formed adjacent distal end 62 along the outer portions of bore 80. Deburring teeth 84 are designed to automatically and quickly remove excess material and rough edges from protective sheath 21 and, possibly, armor wall 18, as end 22 is first inserted over rear section 40 and into bore 80 for connection.

As conduit 17 is rotated onto rear section 40, deburring teeth 84 serve to grind down and smooth out the external surfaces of protective sheath 21 to provide a smooth sealing surface for compression within tapered space 82 and to facilitate insertion of out of shape or slightly oversized conduit 17. While deburring means 83 could be provided as a preformed insert, it is preferred that teeth 84 can be integrally formed within hollow sealing member 60, such as through injection molding or post-molding finishing.

Figure 8:
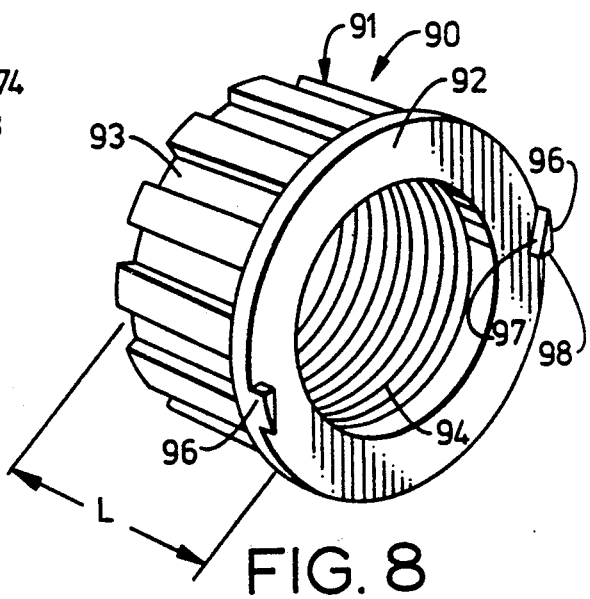
FIG. 8 is a perspective view of a preferred sealing sleeve of the connector assembly of FIG. 1.

Hollow sealing sleeve 90 is best illustrated in FIGS. 1 and 8, and comprises a generally cylindrical body 91 designed to be telescopingly surmounted over at least a portion of sealing member 60. Internal threads 94 are provided for threaded interaction with the corresponding external threads 74 of sealing member 60, whereby axial tightening of sleeve 90 can be accomplished against flange 65. Particularly, sealing sleeve 90 is provided with a substantially planar compression surface 92 designed to contact and deform the outer periphery of flange 65 to force sealing ribs 67 against the outer surface of an electrical box wall 24, as illustrated in FIG. 1. The outer periphery of sealing sleeve 90 is preferably formed with tactile recesses or knurling 93 to facilitate manual tightening of sleeve 90 on sealing member 60. The length L of sleeve 90 should generally correspond to the approximate length of threaded portion 74 of sealing member 60, whereby the planar surfaces 76 will remain accessible to the user for application of tools if desired.

The outer-most periphery of compression surface 92 is also preferably provided with one or more ratchet lugs 96 having an inclined surface 97 and a locking flat 98 to enable relatively unencumbered tightening of sleeve 90 onto sealing member 60, but to prevent the inadvertent backing off or loosening of sleeve 90 once tightened into place. Ratchet lugs 96 will, of course, be designed to lockingly correspond with teeth 72 of peripheral edge 71.

In use, connector assembly 15 can be fully assembled with connector body 30 non-rotatably received within sealing member 60 and sealing sleeve 90 at least partially threaded onto sealing member 60. Thereafter, it is preferred that conduit 17 be sealingly attached to connector 15 by rotatably inserting end 22 into tapered space 82 until a tight compression seal is achieved. Connector 15 with its attached conduit 17 can thereafter be inserted into the aperture 25 of an electrical box wall 24. Upon insertion, locking tabs 37 will be depressed to effectively reduce the diameter of front section 32 until flange 65 abuts the outer surface of wall 24 and dimples 38 snap outwardly to lockingly engage the inner surfaces of aperture 25.

As illustrated in FIG. 1, connector 15 will be firmly locked within aperture 25 by sandwiching electrical box wall 24 between flange 65 and dimples 38. Thereafter, a positive and reliable fluid-tight seal between connector 15 and the outer surface of wall 24 can be insured by tightening sealing sleeve 90 against the deformable portions of flange 65 to force annular sealing ribs 67 against wall 24 about the periphery of aperture 25. In this way, any slack or looseness in the connection between connector assembly 15 and wall 24 can be positively removed, and the connector will be sealed in fluid-tight connection.

The sealing action of sealing sleeve 90 to displace annular sealing ribs 67 is independent of manufacturing tolerances, and enables a dependable seal regardless of variations in part sizes and application conditions. Moreover, by providing sealing sleeve 90 external to connector body 30 and sealing member 60, and with the sole function of ensuring a reliable fluid-tight seal between assembly 15 and wall 24, the connector/box seal is isolated from the connector/conduit seal and each of the connection and sealing operations can be optimized and made more dependable in use.

Locking interaction between serrated teeth 72 and ratchet lugs 96 prevent inadvertent loosening of this fluid-tight connection due to subsequent vibrations or movements commonly encountered in use. It should be understood that the particular structure of the pawl-like teeth 72 and ratch lugs 96 are illustrated only as a preferred arrangement for preventing inadvertent loosening, and other one-way locking devices or similar interacting pawl/detent arrangements could equally be substituted as appropriate. As can be appreciated, provision of planar surfaces 76 and recesses 93 to sealing member 60 and sealing sleeve 90, respectively, may also facilitate application of hand tools to provide additional rotational tightening (or loosening) of sleeve 90 relative to member 60, as needed.

Figure 9:
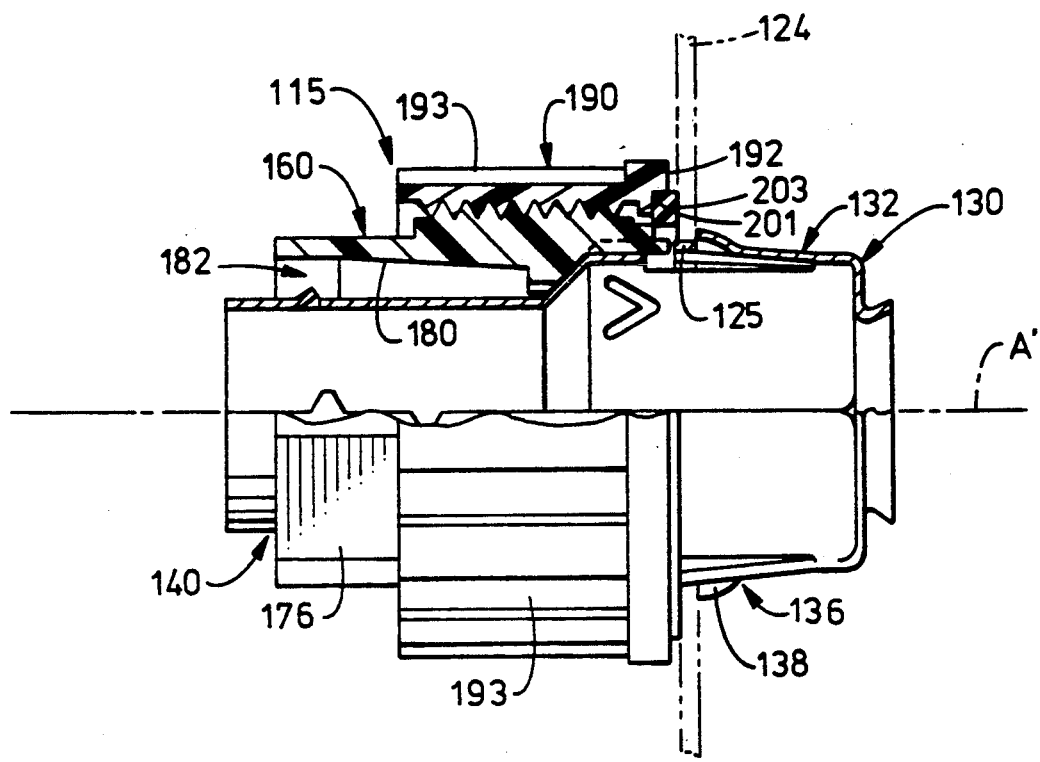
FIG. 9 is a partial cross-sectional view of an alternate preferred embodiment of a connector assembly made in accordance herewith.
Figure 10:
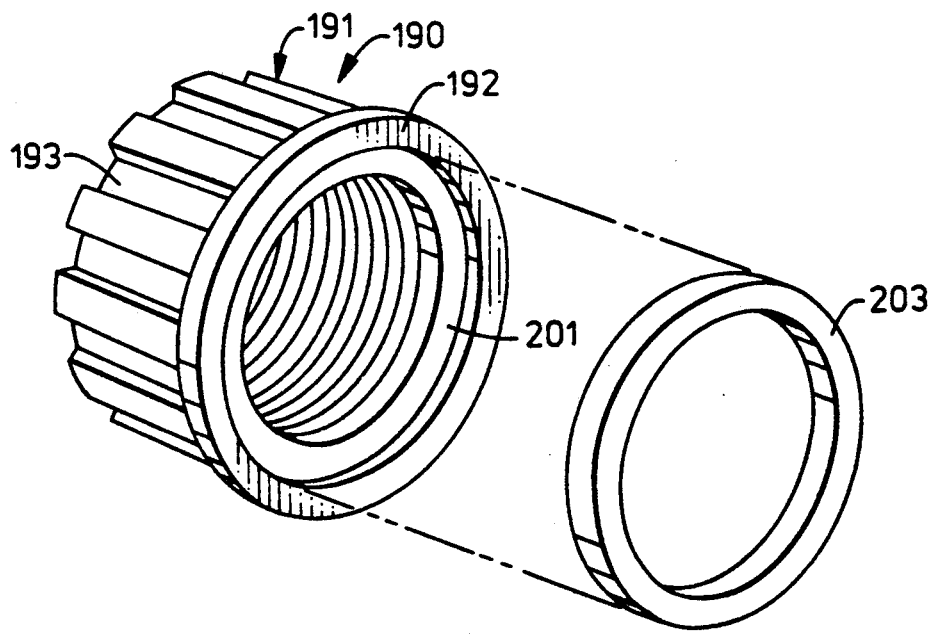
FIG. 10 is a perspective view of the modified sealing sleeve shown in FIG. 9.

FIGS. 9 and 10 illustrate another embodiment of a connector assembly 115 made in accordance with the present invention. As can be seen in FIG. 9, assembly 115 is structurally substantially the same as connector assembly 15 discussed with respect to FIG. 1, except that sealing member 160 does not include a flange (e.g., 65 discussed above) or a sealing rib (e.g., 67) on such flange, respectively. Additionally, sealing sleeve 190 does not include ratchet lugs (e.g., 96 discussed above), but has a relatively planar front face or compression surface 192 and a recessed groove 201 adjacent thereto for receiving a sealing gasket or washer 203. It is preferred that gasket 203 be a ring-like compressible structure, and that it be received at least partially within sealing sleeve 190 to facilitate assembly, shipment, and use. In use, one way lugs or dimples 138 of locking means 136 may also serve to help retain gasket 203 on assembly 115 prior to attachment to a bulkhead (e.g., 124 of FIG. 9).

As will be understood, assembly 115 will be lockingly mounted in an aperture 125 of a bulkhead or similar structure (e.g., bulkhead 124) in a manner similar to that described above. Particularly, fully assembled assembly 115 would be provided with its sealing sleeve at least partially threaded onto sealing member 160, with sealing member 160 substantially non-rotatably telescoped over connector body 130. A conduit (not shown) would thereafter be sealingly attached to rear section 140 of connector 115, such as within space 182. Thereafter, connector 115 and its attached conduit can be snap-locked into aperture 125, and sealing sleeve 190 rotatably reciprocated along axis A' to seal connector 115 about aperture 125 from the outside of that aperture.

Sealing sleeve 190 is rotatably tightened toward sealing engagement between its front face 192 and bulkhead 125, whereby gasket 203 is at least partially compressed to provide a reliable fluid tight seal therebetween. In this way, it can be appreciated that connector assembly 115 provides a relatively simple structure which enables convenient attachment and sealing of assembly 115 to a bulkhead or similar apertured structure without requiring access to the front section of the assembly once it is inserted into the aperture.

While a locking nut could be threaded onto front section 132 after insertion through an aperture, such procedures are generally cumbersome, and inconvenient, and are rendered unnecessary by the snap-lock arrangement and the external sealing sleeve of the present invention. As with the other embodiments of the present invention, the ability to complete a reliable and liquid-tight connection and seal from the exterior (i.e., without a need for access to the front section after insertion) is a real advantage in simplicity, convenience and efficiency.

Having shown and described the preferred embodiments of the present invention, further adaptions of the connector assembly described herein can be accomplished through appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. A connector assembly for providing a substantially fluid-tight connection of a conduit to an electrical box, said assembly comprising:

a substantially tubular hollow connector body having a front section and a rear section, said front section comprising means for lockingly mounting said connector body in an aperture of an electrical box, and said rear section comprising means for receiving the end of a conduit to be connected to said electrical box;

a substantially hollow sealing member having proximal and distal ends and telescopingly mounted over said connector body in substantially non-rotatable condition, said sealing member comprising an outwardly extending flange adjacent said proximal end, a sealing bore for sealingly receiving the end of a conduit, and a means within said bore and adjacent the distal end of said sealing member for deburring the end of said conduit, said flange having an inner surface facing outwardly from said proximal end and further comprising a deformable peripheral portion having at least one annular sealing rib on said inner surface;

means for retaining the end of said conduit within said sealing bore; and a substantially hollow sealing sleeve connected to said sealing member and having a compression surface which can interact with said peripheral portion of said sealing member upon tight connection of said sleeve to said sealing member to insure a substantially fluid-tight seal between said sealing rib and an electrical box.

2. The connector assembly of claim 1, wherein said sealing member further comprises means for non-rotatably receiving said connector body.

3. The connector assembly of claim 2, wherein said means for non-rotatably receiving said connector body comprises a plurality of slots corresponding to locking lugs of said connector body.

4. The connector assembly of claim 1, wherein said bore is tapered inwardly from adjacent the distal end of said sealing member to provide a compression-type seal about the outer periphery of the end of a conduit received.

5. The connector assembly of claim 1, wherein said deburring means comprises a plurality of teeth-like elements adjacent the distal portions of said sealing bore.

6. The connector assembly of claim 4, wherein said sealing bore has a relatively smooth inner tapered surface, and wherein said deburring protuberances are located only along the distal edge of said smooth surface, whereby the end of a conduit will be deburred prior to being received in the smooth portion of said sealing bore.

7. The connector assembly of claim 1, wherein said means for retaining said conduit within said sealing bore comprises a gripping lug on the outer periphery of said rear section of said connector body.

8. The connector assembly of claim 7, wherein said gripping lug comprises one or more rib-like structures arranged in a spiral orientation on the exterior of said rear section to interact with the inner surfaces of a corrugated conduit in a threaded manner.

9. The connector assembly of claim 1, wherein said means for deburring the end of said conduit comprises a plurality of inwardly oriented deburring protuberances.

10. The connector assembly of claim 1, further comprising detent means for preventing inadvertent loosening of a tight connection between said sealing sleeve and sealing member when in assembled condition.

11. The connector assembly of claim 10, wherein said detent means comprises a plurality of pawl-like teeth on said flange and one or more ratchet lugs on said sealing sleeve which interact to effectively prevent loosening of a tight connection between said sleeve and said sealing member.

12. A connector assembly for providing a substantially fluid-tight connection of a flexible metallic conduit to an aperture of an electrical box, said assembly comprising:

a substantially tubular hollow connector body having a front section and a rear section, said front section comprising means for lockingly connecting said connector body in said aperture, and said rear section comprising a male end for insertion into the end of a flexible conduit to be connected to said electrical box;

a substantially hollow sealing member having proximal and distal ends and telescopingly mounted over said connector body and connected thereto in substantially non-rotatable condition, said sealing member comprising an outwardly extending flange adjacent said proximal end, a sealing bore for sealingly receiving the end of a flexible conduit, and a plurality of inwardly oriented deburring protuberances within said bore and adjacent the distal end of said sealing member, said flange having an inner surface facing outwardly from said proximal end and further comprising a deformable peripheral portion having at least one annular sealing rib on said inner surface;

means for positively retaining the end of said flexible conduit within said sealing bore; and a substantially hollow sealing sleeve telescopingly connected over at least a portion of said sealing member and having a compression surface which contacts said peripheral portion of said sealing member upon tight connection of said sleeve to said sealing member and forces said sealing rib against said electrical box to provide a substantially fluid-tight seal about said aperture, said sleeve further comprising means for preventing the connection between said sleeve and sealing member from being loosened once it is made tight.

13. The connector assembly of claim 12, wherein said means for preventing the connection between said sleeve and sealing member from loosening comprises corresponding and interacting pawl/detent elements formed on said sleeve and sealing member, respectively.

14. The connector assembly of claim 12, wherein said deburring protuberances comprise a plurality of teeth-like elements adjacent the distal portions of said sealing bore.

15. The connector assembly of claim 14, wherein said teeth-like elements are integrally formed adjacent the outermost portions of said sealing bore.

16. The connector assembly of claim 12, wherein said connector body is formed from a single integral blank of material.

17. The connector assembly of claim 12, wherein said sealing member further comprises means for non-rotatably receiving said connector body, said receiving means comprising a plurality of slots corresponding to locking lugs associated with said connector body.

18. The connector assembly of claim 12, wherein said means for retaining the end of said flexible conduit within said sealing bore comprises a plurality of gripping lugs formed on the outer periphery of said rear section of said connector body.

19. A connector assembly for providing a substantially fluid-tight connection of a flexible metallic conduit to an aperture in the wall of an electrical box, said assembly comprising:

a substantially tubular hollow connector body having a front section and a rear section, said front section comprising means for lockingly connecting said connector body in said aperture, and said rear section comprising a male end for insertion into the end of a flexible metallic conduit to be connected to said electrical box;

a substantially hollow sealing member having proximal and distal ends and telescopingly connected over said connector body in non-rotatable condition, said sealing member comprising an outwardly extending flange adjacent said proximal end, a tapered sealing bore for sealingly receiving the end of the sheathed flexible metallic conduit, and a plurality of inwardly oriented teeth-like deburring elements formed within said bore adjacent the distal end of said sealing member, said flange having an inner surface facing outwardly from said proximal end and further comprising a deformable peripheral portion having at least one integral annular sealing rib on said inner surface;

said rear section of said connector body including a plurality of gripping lugs for positively retaining the end of said flexible metallic conduit within said sealing bore; and a substantially hollow sealing sleeve telescopingly surmounting at least a portion of said sealing member and having a compression surface which contacts said peripheral portion of said sealing member upon tight connection of said sleeve to said sealing member thereby displacing said sealing rib against said wall to insure a substantially fluid-tight seal between said sealing member and an electrical box, said assembly further comprising interacting pawl/detent elements formed on said sleeve and sealing member, respectively, for preventing the connection between said sleeve and said sealing member from being loosened once it is made tight.

20. The connector assembly of claim 19, wherein said connector body comprises a plurality of locking lugs which are received within a plurality of corresponding slots of said sealing member to non-rotatably connect said hollow sealing member relative to said connector body.

21. A connector assembly for providing a substantially fluid-tight connection of a conduit to a bulkhead, said assembly comprising:
a substantially tubular hollow connector body having a front section and a rear section, said front section comprising means for lockingly mounting said connector body at an aperture of a bulkhead, and said rear section comprising means for receiving the end of a conduit to be connected to said bulkhead;
a substantially hollow sealing member having proximal and distal ends and attached to said connector body in substantially non-rotatable condition, said sealing member comprising an outwardly extending flange adjacent said proximal end, a sealing bore for sealingly receiving the end of a conduit, said flange having an inner surface facing outwardly from said proximal end and further comprising a deformable peripheral portion having at least one annular sealing rib on said inner surface;
means for retaining the end of said conduit within said sealing bore; and
a substantially hollow sealing sleeve connected to said sealing member and having a compression surface which can interact with said peripheral portion of said sealing member upon tight connection of said sleeve to said sealing member to insure a substantially fluid-tight seal between said sealing rib and a bulkhead.

22. The connector assembly of claim 21, wherein said means for lockingly mounting said connector body comprises at least one one-way lug arranged with said front section, whereby said front section with its one-way lug is insertable through said aperture, and said lug prevents withdrawal once inserted.

23. A connector assembly for providing a substantially fluid tight connection of conduit to a bulkhead, said assembly comprising:
a substantially tubular hollow connector body having a longitudinal axis and front and rear sections therealong, said front section comprising means for lockingly mounting said connector body in an aperture of a bulkhead, and said rear section comprising means for receiving the end of a conduit to be connected;
a substantially hollow sealing member having proximal and distal ends and telescopingly connected over said connector body in substantially non-rotatable condition, said sealing member comprising a sealing bore for sealingly receiving the end of a conduit;
means for retaining the end of said conduit within said sealing bore;
a substantially hollow sealing sleeve connected to said sealing member and being selectively axially reciprocable therealong, said sleeve comprising a sealing surface and means for interacting with said sealing member to retain said sleeve in a selected axial position; and
a deformable sealing member mounted adjacent said sealing surface to provide a substantially fluid tight seal between said bulkhead and said assembly.

24. The connector assembly of claim 23, wherein said sealing sleeve is threadedly attached about said hollow sealing member, whereby rotation of said sleeve relative to said hollow sealing member provides said axial reciprocation.

25. The connector assembly of claim 23, wherein said deformable member comprises a ring-like gasket mounted on said hollow sealing member adjacent said sealing surface.

26. The connector assembly of claim 23, wherein said means for lockingly mounting said connector body comprises at least one one-way lug arranged with said front section, whereby said front section with its one-way lug is insertable through said aperture, and said lug prevents withdrawal once inserted.

27. The connector assembly of claim 26, comprising a pair of one-way locking lugs attached to said front section, said locking lugs being displaceable inwardly to permit insertion of portions of said front section and the lugs through an aperture, and expandable outwardly to prevent withdrawal of said assembly from said aperture thereafter.

28. A connector assembly for providing a substantially fluid tight connection of a conduit to a bulkhead, said assembly comprising:
a substantially tubular hollow connector body having a longitudinal axis and front and rear sections therealong, said front section comprising means for lockingly mounting said connector body at an aperture of a bulkhead;
a substantially hollow sealing member having proximal and distal ends and telescopingly connected over said connector body in substantially non-rotatable condition, said sealing member comprising a sealing bore for sealingly receiving the end of a conduit;
means for retaining the end of said conduit within said sealing bore;
a substantially hollow sealing sleeve having a forward end and threadably telescoped over said sealing member for selective axial reciprocation therealong by relative rotation therewith, said sleeve comprising a sealing surface adjacent its forward end; and
a ring-like sealing member mounted on said sealing sleeve adjacent said sealing surface.

* * * * *